(12) United States Patent
Erickson et al.

(10) Patent No.: US 7,249,180 B2
(45) Date of Patent: Jul. 24, 2007

(54) METHOD AND SYSTEM FOR MARKETPLACE SOCIAL PROXIES

(75) Inventors: Thomas D. Erickson, Minneapolis, MN (US); Peter K. Malkin, Arsdley, NY (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 09/727,079

(22) Filed: Nov. 30, 2000

(65) Prior Publication Data

US 2002/0032729 A1 Mar. 14, 2002

Related U.S. Application Data

(63) Continuation-in-part of application No. 09/662,499, filed on Sep. 14, 2000.

(51) Int. Cl.
G06F 15/16 (2006.01)
G06F 15/177 (2006.01)

(52) U.S. Cl. .......... 709/226; 709/229; 705/36; 705/37; 345/418

(58) Field of Classification Search ........ 709/203, 709/206, 220, 222, 224, 226, 228, 218, 245, 709/238; 705/37, 36; 707/10; 434/350; 345/418, 594
See application file for complete search history.

(56) References Cited

U.S. PATENT DOCUMENTS

| | | | | |
|---|---|---|---|---|
| 5,835,896 A | * | 11/1998 | Fisher et al. .......... | 705/37 |
| 6,374,300 B2 | * | 4/2002 | Masters .......... | 709/229 |
| 6,473,802 B2 | * | 10/2002 | Masters .......... | 709/229 |
| 6,496,681 B1 | * | 12/2002 | Linton .......... | 434/350 |
| 6,564,261 B1 | * | 5/2003 | Gudjonsson et al. ....... | 709/227 |
| 6,708,172 B1 | * | 3/2004 | Wong et al. .......... | 707/10 |
| 2002/0133548 A1 | * | 9/2002 | Erickson et al. .......... | 709/204 |
| 2003/0101124 A1 | * | 5/2003 | Semret et al. .......... | 705/37 |
| 2005/0144115 A1 | * | 6/2005 | Brett .......... | 705/37 |

OTHER PUBLICATIONS

Chavez et al, A Multi-agent System for Distributed Resource Allocation, MIT Media laboratory, 1997, pp. 323-331.*

* cited by examiner

Primary Examiner—Khanh Quang Dinh
(74) Attorney, Agent, or Firm—F. Chau & Associates, LLC

(57) ABSTRACT

The present invention relates to a method for providing an electronic environment for facilitating user interaction with a business. The method displays an abstract graphical proxy for the environment, displays an abstract graphical proxy for at least one consumer within the environment, and provides the consumer with interactive business facilities. The environment is a marketplace structured by the business. The environment includes a chat application. The chat application includes one of private chat and public chat. The environment comprises interactive applets. Each consumer proxy is individualized according to consumer input or each consumer proxy is individualized according to consumer activity.

8 Claims, 4 Drawing Sheets

METHOD AND SYSTEM FOR MARKETPLACE SOCIAL PROXIES

This is a continuation-in-part of the commonly assigned application Ser. No. 09/662499, filed Sep. 14, 2000, the disclosure of which is incorporated by reference in its entirety herein.

BACKGROUND OF THE INVENTION

1. Field of the Invention

The present invention relates to social proxies, and more particularly towards a marketplace social proxy for the facilitation of business-to-consumer interaction.

2. Description of Prior Art

The growth of on-line consumer support and sales has led to important questions regarding consumer education, attitude change, persuasion, decision making, and satisfaction in on-line environments. Current on-line sales environments isolate consumers from one another. These sales environments provide only basic sales service, for example, offering a picture of the product/service and a general description. Some independent services (e.g., cnet.com) provide consumer-to-consumer interaction via bulletin boards to serve as distributed knowledge (opinion) reservoirs. However, no known direct sales approach has implemented a system or method for consumer-to-consumer interaction.

In the area of online user interaction, there are several efforts working towards creating a computer interface capable of displaying intangible qualities typically associated with live interaction. In particular, FTP, NNTP, IRC (e.g., The Palace), Babble, Loom, Coordinator, usage summaries for web sites, Ebay and Amazon.com's user interface. These systems include elements which relate to attributes normally associated with a physical interaction. For example, by posting the number of visitors to a web site (e.g., usage summaries), a user can have a feeling of belonging to a larger group of people interested in that web site. These and other systems are described below.

FTP allows online users "anonymous"—to have access to a collection of documents; one or more users being authorized to add documents to the collection. (See Ed Krol, The Whole Internet Catalog. O'Reilly and Associates, Inc. Sebastopol, Calif. 1992.) Interfaces to FTP-accessible collections of documents (e.g., bulletin boards) do not provide dynamically updated, graphical representations of the activity of a given online marketplace environment.

NNTP or network news, provides a venue in which users can asynchronously post messages and responses into administered news groups (i.e., predefined groups of messages which are meant to relate to specified topic, e.g., all articles in alt.sport.soccer should deal with soccer), every post indicating the ID of the contributor. Lotus Notes' discussion databases provide a functionally equivalent form of online interaction. Here again, no resource based on these technologies provide business users with a dynamically updated, graphical representation of the activity of a given online business environment.

Internet Relay Chat (IRC) is similar to NNTP in that it allows users to post messages and responses in predefined topic areas—called channels in IRC. The main difference with IRC is that the interactions are synchronous rather than asynchronous as in NNTP.

The Palace, is a collection of Internet chat rooms. The site uses a graphical display and user icons. A Palace Site is an online community where users can come together and chat while being represented by a graphical image. There are thousands of existing Palace Sites. Users can connect to The Palace Sites with The Palace Viewer (PTV) or The Palace User Software. Currently, channels available include: Welcome, TV, Movies, Music, Romance, Teens, and International. Within each channel is a collection of related Palace Sites. For example, within the Music channel, specific Palaace Sites may exist for particular genres or artists. TPV allows users to visit Palace Sites through their web browsers. With TPV and The Palace Server, a user can add a Palace community to a web site. The Palace User Software enables a user to connect to all the different Palace Sites located in Palace Space.

Other implemented forms providing synchronous online communication also exist, for example, Instant Messaging from Apple, and the discussion section of Groove from Groove Networks, Inc. Although these applications and systems provide user with a list of all operational clients, none provides a dynamically updated graphical representation indicating the type or level of activity of the users.

Loom, a visualization tool for Usenet (NNTP) news groups, provides a technique for displaying the emotional mood (e.g., hostile, happy) of an NNTP-based online community (e.g., a Usenet news group) by analyzing the content of its interactions. (See Judith Donath et al. "Visualizing Conversation" published in the *Journal of Computer Mediated Conversation*. Volume 4, number 4, June 1999.) Although this utility can analyze online interactions and provide a graphical representation of aspects of the interactions, it only provides this information asynchronously, specifically by analyzing the overall content records from each NNTP room. Thus, the graphical representation it provides is not dynamically updated.

Babble provides dynamic indicators of the presence and activity of all operational users with respect to the available topics (i.e., discussion areas created by the users). These indicators are computed using the activities of the participants (e.g., connections, postings, and topic switches). (See Thomas Erickson, et al. "Socially Translucent Systems: Social Proxies, Persistent Conversation, and the Design of 'Babble.'" published in *Human Factors in Computing Systems: The Proceedings of CHI '99*. ACM Press, 1999.) Although lightly structured styles of interaction are frequently adopted (e.g., interaction in the "-Commons Area-" is informal conversation, while interaction in the "Babble Problems" topic consists of serious question/answer dialogs), no way is provided to customize the graphical representation or the information it renders so that the specific critical qualities and quantities of an online marketplace are (dynamically) displayed.

Online games, like chess and bridge (e.g., Chessmaster 6000 by Mindscape, Inc.), provide structured and enforced styles of interaction, but not ones that dynamically and graphically indicate the activity of a given online marketplaces.

Coordinator, a method of structuring human communications, provides an electronic mail-based system that allows users to structure conversations and track tasks. For example, a typical interaction begins with a "Request" message from person A to person B, requesting something from person B by a certain date. This e-mail note asks Person B to respond with a "Promise" message (promising to perform the action), with a "Decline" message (declining to perform the action), or with a "Counteroffer" message (offering to perform the action by a different date or to perform a different action). If B promises to do the action, then a typical conversation might continue with B, eventually sending a "Report completion" message (indicating that the action has been performed) and A replying with a "Close" message (indicating that the action was performed satisfactorily). (See: Flores et al. "Method and Apparatus for Structuring and Managing Human Communications By Explicitly Defining the Types of Communications Permitted Between Participants." U.S. Pat. No. 5,208,748, May 4, 1993.)

The Oval implementation of Coordinator extends the base functionality by allowing end-users to modify interaction rules mid interaction (see Malone et al. "Experiments with Oval: A Radically Tailorable Tool for Cooperative Work" via URL http://ccs.mit.edu/papers/CCSWP181/index.html#4b).

Thus, Coordinator, implemented with Oval allows users to define and maintain structured styles of online interaction. These two facilities still fail to provide a dynamically updated, graphical representation of the state and activity within a given online marketplace; and handle interactions where messages are posted to a group of recipients, all of whom are not known a priori (e.g., as is the case in many online business environment, i.e., one often does not know who one's customers will be at the start of the day).

In the online auctions provided by Ebay.com., users can get data concerning the activity of other buyers and sellers (e.g., how many transactions they have successfully completed). Although this provides an indication of user activity in a online marketplace, no dynamically updated, graphical representation is provided.

Amazon.com also provides information concerning the activities and comments from it customers. E.g., for any given product sold by Amazon.com, one can learn what other buyers who have purchased the given product have also bought (e.g., customers who purchased the first Harry Potter book also purchased every other book about Harry Potter). Although this provides indication of user activity, Amazon.com does not provide any graphical representation, nor does it provide information that is dynamically updated.

Therefore, a need exists for a method and system for implementing a graphical online environment including consumer and business proxies for providing a dynamically updated, graphic view (representation) of current marketplace conditions.

SUMMARY OF THE INVENTION

The present invention relates to a method for providing an electronic environment for facilitating user interaction with a business. The method displays an abstract graphical proxy for the environment, displays an abstract graphical proxy for at least one consumer within the environment, and provides the consumer with interactive business facilities. The environment is a marketplace structured by the business. The environment includes a chat application. The chat application includes one of private chat and public chat. The environment comprises interactive applets. Each consumer proxy is individualized according to consumer input or each consumer proxy is individualized according to consumer activity.

In one embodiment of the present invention, a method is provided including representing a social proxy in an abstract graphical display of a marketplace for facilitating consumer interaction, defining a consumer proxy of a consumer, the consumer proxy having updatable variables, displaying the consumer proxy within the abstract graphical display of the marketplace, and updating the consumer proxy variables periodically. The social proxy is defined by a provider. The social proxy is extensible. The social proxy is used interactively by the consumer with an application, wherein the application is an extension of the social proxy. The method also displays a link to a second social proxy. The social proxy is one of a plurality of social proxies within a hierarchical system of proxies. Displaying the consumer proxy, further includes limiting data displayed based on a consumer's access credentials. The abstract graphical display of the marketplace is an auction proxy including concentric circles, an inner-most circle for displaying auction information, an inner circle for indicating bidding activity, and an outer circle for indicating user interest. The abstract graphical display of the marketplace is a line including at least two consumer proxies, the line indicating the consumer proxies priority with respect to a service provided by a business. The method further includes the steps of defining a business proxy of a business, the business proxy having updatable variables, displaying the business proxy within the abstract graphical display of the marketplace, and updating the business proxy variables periodically. The business proxy may interact with the consumer proxy.

According to an embodiment of the present invention, the method steps can be performed by a program storage device readable by machine, tangibly embodying a program of instructions executable be the machine.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
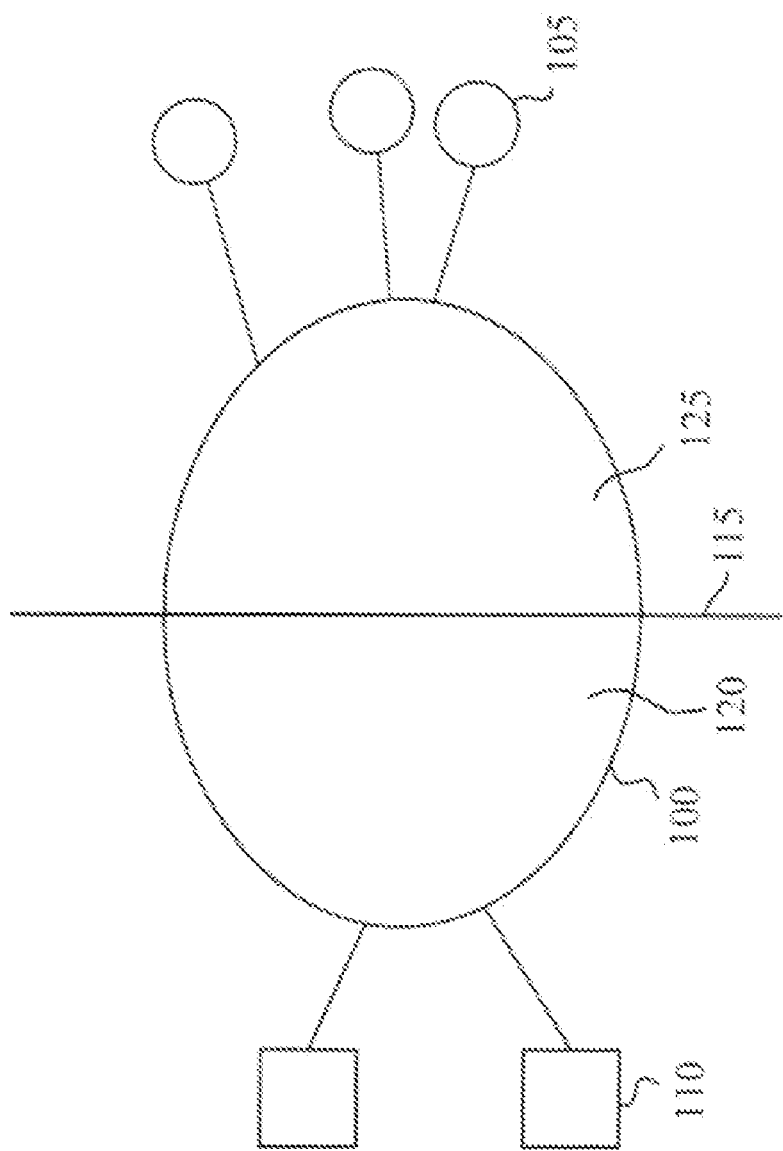
FIG. 1 is an illustrative diagram of a system architecture according to an embodiment of the present invention.

The present invention provides a system and method for providing consumers of a given business with a dynamically updated, abstract graphical view of marketplace interactions. The present invention creates a graphical view of the marketplace for consumers including, for example, consumer proxies, business proxies, and graphical displays of product/service information. Through the visual presentation of interactions, the present invention provides an open marketplace where consumers are provided information and software applications.

The abstract graphical representation of an environment is a social proxy. A social proxy can show the presence of consumers and/or objects in a physical or virtual space. Further, a social proxy can provide indications of activity, including degree of activity, and activity with respect to others and/or shared resources. Data relating to the marketplace activity can be periodically updated or transmitted over a network in real time. The present invention is a translucent system providing perceptually-based social cues, affording consumer awareness. The translucent environment provided by the system can have updatable variables.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, an on-line environment is provided which, for example, creates consumer loyalty, directs consumer anxiety, provides useful information, and increases business efficiency. The environment allows on-line consumers to see other members of an ad hoc business/consumer community. For example, each user has a corresponding user social proxy which is displayed to all users in the environment. Allowing consumers to identify with others can build a feeling of membership, this feeling of membership in an active business community (marketplace) can lead to, among other things, greater consumer loyalty (stickiness).

Referring to FIG. 1, a server 100 provides an interface 115 for users (e.g., 105) and business associates or employees (e.g., 110). The server 100 organizes users and business associates in to a defined social proxy, for example, having an interface 115 which manages interactions between a user area 125 and a business area 120 so that users are provided access to business associates based on defined criteria. The criteria can include, for example, first-come-first-served, and priority for users subscribed to a service agreement.

Figure 2:
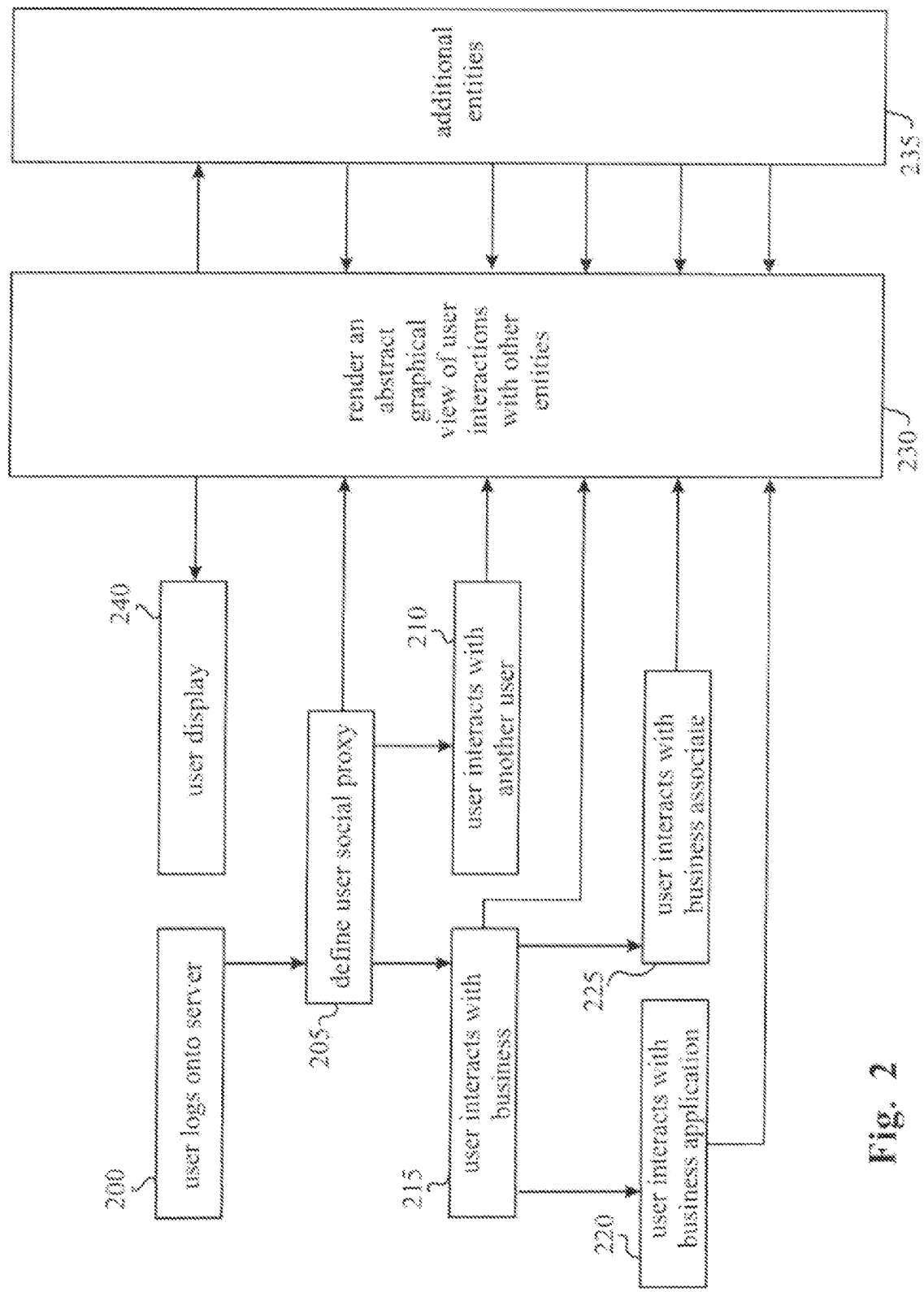
FIG. 2 is a block diagram of a method of presenting a user with an abstract graphical view of on-line interactions according to the present invention.

Referring now to FIG. 2, a user can connect to a server 200 and view an abstract graphical view of interactions within a social proxy of a business environment. The server 200 can define a user social proxy 205, the user social proxy is incorporated into the abstract graphical environment 230 displayed to the user 240. The user social proxy can incorporate variables defined by the server and/or defined by the user, for example, the server may assign the user proxy a number based on a list of users, and the user may assign a pixel map for use as a background within the users social proxy. The business environment and user social proxies thus can have elements which can be personalized by the user. Users can interact with other users 210 and the business 215. The business can have separate components for user interaction, for example, applications 220 for automated handling of transactions, and business associates 225 for personal service. Variables are reported to the server for incorporation into the abstract graphical display. These variables can include, for example, interactions with other entities and user related information such as the length of time a user has been connected to the server. The server will also incorporate the interactions of other users and/or business associates 235. The abstract graphical display viewed by each user includes the other users within the environment.

In one embodiment of the present invention, a consumer can make an independent inference about the current supply and demand of a particular service with respect to the business with which the consumer is currently engaged. The ability to draw such an inference can help the consumer to direct anxiety (e.g., over waiting for a service) at other consumers (e.g., consumer taking an unusually long time to be served), rather than at the service provider. Alternatively, a consumer who knows that the wait may only last a few more minutes may be able to relax having that knowledge.

According to a preferred embodiment of the present invention, the marketplace social proxy is extensible. For example, a consumer can be provided with a diversion during a transaction. The availability of a diversion can enable the consumer to watch their progress in line (much like the indication for network downloads which shows the percentage of the download which has completed). In addition to the consumer interface displaying consumer proxies, diversions can include, among other things, simple games, interactive programs such as the Xeyes client for the X Windows system or Bonzi Buddy (See, www.bonzi.com), music, and interesting facts (e.g., "our business also offers product/service 'X'"). In addition, a diversion may help to deflect a consumer's fixation with time, helping to speed the moment from the consumer's point of view.

Another example of an extension can include consumer tools for communicating with other consumers. These tools can include, for example, announcements, group chats, and private chats within the marketplace social proxy. Communication between consumers (e.g., members of a help line) allows them to discuss issues amongst themselves, potentially enabling them to resolve problems without the help of the business staff.

The present invention provides a third-person view of other transactions within the marketplace. For example, consumers waiting in line can learn the specifics of the transactions for which they are waiting (e.g., #1: give teller club card; #2: specify product number, #3: specify means of payment, credit card purchases requiring both credit card number and expiration date). This type of third-person instruction can speed transactions by better preparing consumers once it is their turn. Vendors both internal and external, can sell to current consumers while they are doing business.

In addition, businesses can use these ad hoc communities as focus groups, e.g., by participating in chat with consumers a business can learn about them, including feelings about the given business, take suggestions for improving service, etc. A business can participate passively by monitoring postings to a message board. For example, a business associate or a computer program can monitor a message board for key words, saving comments including those key words (e.g., a product name). These comments may be useful in, for example, product development and customer service. Likewise, the message board may be monitored for flame words, for example, words indicating that the user is expressing a feeling. Public opinion can therefore, also be assessed. In addition, a business may actively participate in a chat session by asking questions of the users. For example, "How can we improve the user interface?"

Figure 3:
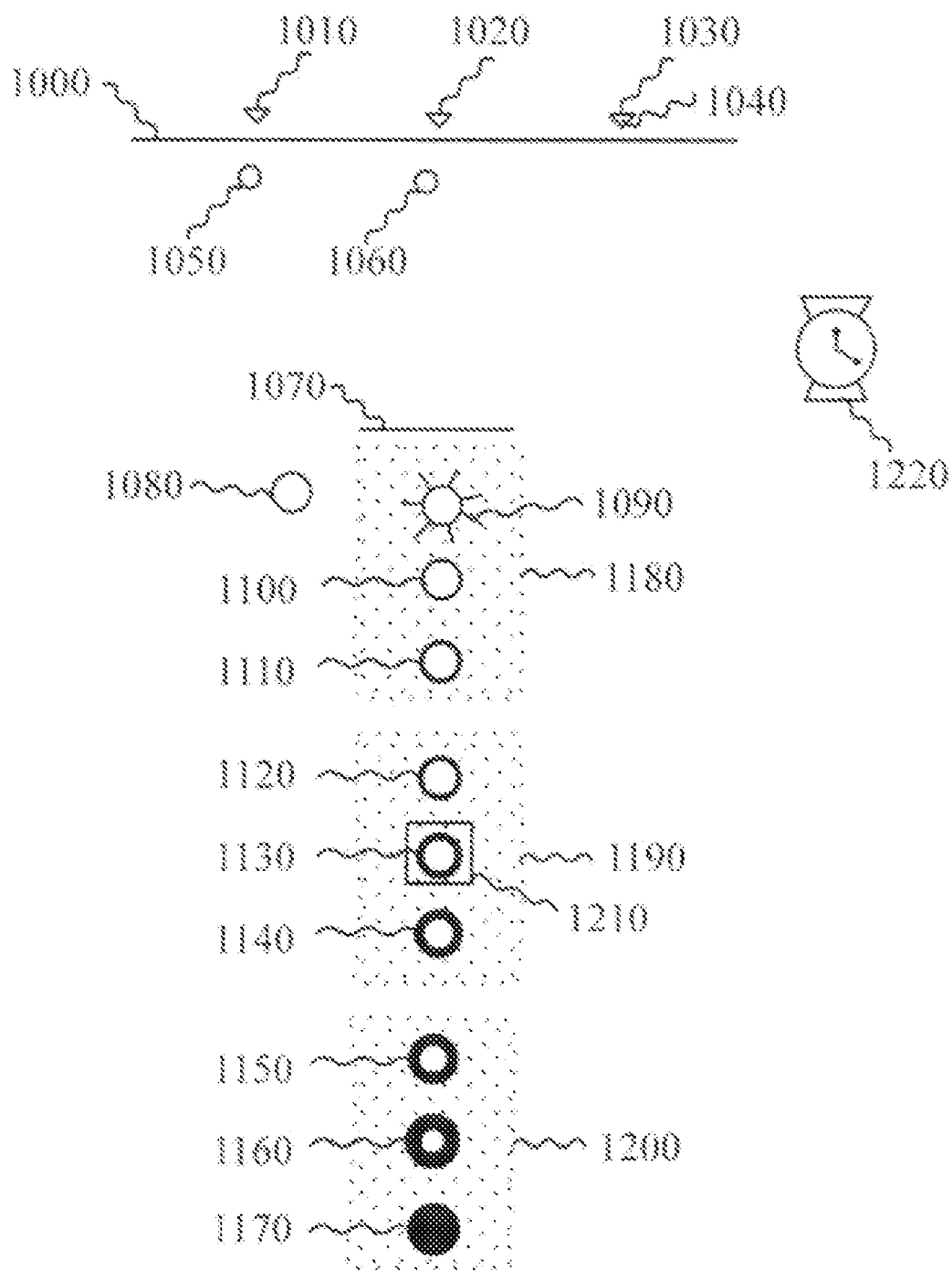
FIG. 3 shows a graphical representation of an online line.

A preferred embodiment of the present invention will now be discussed with respect to FIG. 3. FIG. 3 depicts a graphical representation of an online line, e.g., a queue of online consumers of a given service, who are all waiting to be served. Currently, for call-in services, one is either given some indication of how long their wait will be, or simply assured that they will be served in the order in which they called. In the present embodiment the consumer is given a graphical indication of the expected wait, e.g., the consumer can watch, in real time, the progress of the queue. By being able to determine on one's own, a estimated wait time, the consumer is empowered with a sense of control, rather than being instructed by a recorded message an estimated wait.

As shown in FIG. 3, the separator between servers and consumers (consumers) is represented by a line (1000), with the service providers represented by the geometric shapes (1010, 1020, and 1030) located above the line. Service providers who have just become available are indicated with an asterisk (1040). Those with ordinary skill in the art will appreciate, in light of the present disclosure, that there are many other ways to represent the service providers, as well as those providers that have just become available, including but not limited to the use of different colors and sizes. Dots (1050 and 1060) just below the line (1000) represent those consumers that are being served. In a preferred embodiment of the present invention each dot (1050 and 1060) can have a time indicator associated with it, for example, displaying the amount of time the given consumer has spent with a service provider. The time indicator can be embodied in, for example, a flyout box displayed when a consumer positions a mouse cursor over a given dot, a permanent analog representation, etc. This can allow those waiting to identify consumers that appear to be holding up the line (e.g., taking too long).

Returning to FIG. 3, line 1070 indicates the head of the line, with dots 1080, 1100 through 1170, and star 1090 representing consumers waiting in line. The square (1210) surrounding dot 1130 indicates the particular consumer who is currently both waiting in the line and viewing the proxy. Shaded areas 1180, 1190, and 1200 represent sets of consumers with approximately the same estimated wait. A given consumer of the interface can retrieve this estimation by moving their mouse cursor over the area of interest and dwelling there momentarily; a pop-up box will appear with the estimated wait time for the corresponding section. Note that the estimated wait time could also simply be listed to the side of the given section. The clock (1220) displays the estimated wait time for the given current consumer (e.g., the consumer represented by dot 1130, the dot that is surrounded by square 1210).

The usual progression of this representation is that as a service provider (one of triangles 1010-1030) becomes free, the next dot (1080, 1100-1170), or start (1090) located below line 1070, moves to the space just below line 1000 below the open consumer provider (star shapes switching back to dots after the move).

Dot 1080 is located to the left of top section 1180 and there is a star (1090) just to its right, a star located with section 1180. This arrangement indicates that the consumer represented by dot 1080, let the consumer represented by star 1090 takes its place in line. Once 1090 is served and 1090 is removed from the queue, dot 1080 moves right into the place previously occupied by 1090.

Also note that the thickness of the edges of the dots (1080, and 1100-1170) increases the further back in line the given dot is located. This edge thickness indicates the increasing length of the estimated wait for the associated consumer.

Those with ordinary skilled in the art will appreciate, in light of the present disclosure, that by selecting a particular consumer dot, for example, 1110, viewers of this online line can retrieve information about the given consumer. This information can include, for example, consumer name and e-mail address. Similarly, by selecting the triangle of one of the service providers (1010-1030), a consumer can retrieve information about the associated service provider, for example, their average response time and their average number of successful transactions.

The present invention contemplates a key for providing a list of the estimated wait for each edge thickness shown. Further, other features can be used to represent consumer information, for example, color, intensity and/or dot size.

In addition to revealing consumer information and profiles, the present invention can present information relating to sellers and businesses. For example, the social proxy concept is applied to consumer support representatives. Now a business can visualize the current consumer to representative ratio and adjust service accordingly, for example, shifting man power from sales to support services. Further, solutions presented to one consumer can be made available to other consumers waiting to be served. Therefore, a consumer waiting in line can have his or her issue resolved without the need for personal consumer support interaction.

Figure 4:
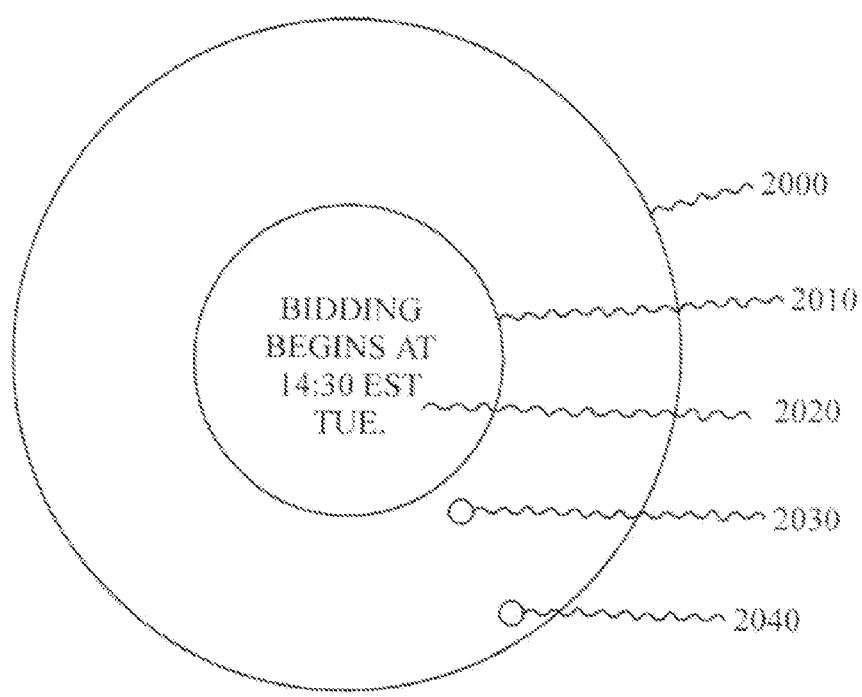
FIG. 4 shows a graphical representation of an auction.

FIG. 4 illustrates an example of a graphical representation of an activity proxy for an online auction. In FIG. 4, the outside circle (2000) represents a particular auction. An auction can involve, for example, automobiles and service contracts. The dots (2040 and 2030) located between circle 2000 and concentric circle 2010 represent consumers who have requested information regarding this auction. Each dot's radial distance from the center represents how recently respective requests were made. Thus, as shown, dot 2030's consumer has requested information more recently than dot 2040's consumer. The area within the circle 2010 indicates when the auction will begin, e.g., "Bidding begins at 14:30 EST TUE" (2020).

FIG. 4 is one example of a marketplace social proxy. Other configurations are contemplated, for example, an auction having several concentric circles, each circle indicating a different level (e.g., frequency) and/or type (e.g., actively bidding or spectating) of activity. The abstract graphical display of the marketplace can implement any configuration which imparts information, for example, various defined areas indicating the levels of defined activity. These areas can be, for example, stacked, one on top of another, each plane providing an abstract graphical display of a different type of transaction. The areas may also be distinguished by color, texture, etc.

The proxies described above are elements in an on-line environment designed to facilitate consumer loyalty, satisfaction, etc. By implementing these same graphical indicators on the business side for display to the consumers, a feeling of openness can be imparted. That is, that the business is actively engaged in assisting the consumer in their affairs.

In yet another embodiment of the present invention, business products and services are displayed as social proxies indicating, for example, the volume in stock, the estimate time of arrival for specific deliveries, and complementary products (e.g., by linking or grouping product proxies).

In yet another embodiment, the present invention facilitates consumer-to-consumer interaction with, for example, integrated chat rooms having pre-programmed scripts for expressing actions and/or emotions by simply typing an abbreviation. This type of communication enhancement will enable consumers to better express emotions, and as a result enable the business to adjust to, or react to, changes in consumer attitudes.

Having described embodiments of a system and method for providing a translucent online marketplace having social proxies, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set for in the appended claims.

What is claimed is:

1. A computer-implemented method comprising the steps of:
  representing a social proxy of a marketplace in an abstract graphical display for facilitating consumer interaction through visual presentation of interactions, wherein the abstract graphical display of the market place is an auction proxy including concentric circles, an inner most circle for displaying auction information, an inner circle for indicating user bidding activity, and an outer circle for indicating user interest;
  defining a consumer proxy of a consumer, the consumer proxy having updatable variables;
  displaying the consumer proxy within one of the inner circle and the outer circle of the abstract graphical display of the marketplace; and
  updating the consumer proxy variables periodically, wherein the consumer proxy moves within the auction proxy according to changes in the consumer proxy variables.

2. The computer-implemented method of claim 1, wherein the social proxy is defined by a provider.

3. The computer-implemented method of claim 1, wherein the social proxy is extensible.

4. The computer-implemented method of claim 3, wherein the social proxy is used interactively by the consumer with an application, wherein the application is an extension of the social proxy.

5. The computer-implemented method of claim 1, further includes the step of displaying a link to a second social proxy.

6. The computer-implemented method of claim 1, wherein the social proxy is one of a plurality of social proxies within a hierarchical system of proxies.

7. The computer-implemented method of claim 1, wherein the step of displaying the consumer proxy, further comprises limiting data displayed based on a consumer's access credentials.

8. The computer-implemented method of claim 1, further comprising the steps of:
  defining a business proxy of a business, the business proxy having updatable variables;
  displaying the business proxy within the abstract graphical display of the marketplace; and
  updating the business proxy variables periodically.

* * * * *